United States Patent [19]

Abe et al.

[11] Patent Number: 5,081,756
[45] Date of Patent: Jan. 21, 1992

[54] METHODS FOR ASSEMBLING AND ADJUSTING A MAGNETIC ENCODER DEVICE

[75] Inventors: Hiraku Abe, Miyagi; Hidemasa Suzuki, Furukawa; Ichiro Tokunaga, Furukawa; Yasuaki Ogawa, Furukawa, all of Japan

[73] Assignee: Alps Electric Co., Ltd., Tokyo, Japan

[21] Appl. No.: 534,788

[22] Filed: Jun. 7, 1990

Related U.S. Application Data

[62] Division of Ser. No. 332,640, Mar. 31, 1989, Pat. No. 4,959,574.

[30] Foreign Application Priority Data

May 28, 1988 [JP] Japan .................................. 63-129461

[51] Int. Cl.⁵ ............................................. H01F 7/06
[52] U.S. Cl. ..................................... 29/593; 29/602.1; 324/202
[58] Field of Search .................. 29/602.1, 593, 607; 324/202, 207.20, 207.21

[56] References Cited

U.S. PATENT DOCUMENTS 4,231,150 11/1980 Brooks ........................... 29/602.1
4,944,028 7/1990 Iijima et al. .................. 324/207.12

FOREIGN PATENT DOCUMENTS 48104 4/1981 Japan ............................. 324/207.21

Primary Examiner—P. W. Echols
Attorney, Agent, or Firm—Guy W. Shoup; B. Noel Kivlin

[57] ABSTRACT

Methods are provided for assembling a magnetic encoder wherein fluctuation of a magnetic gap arising from a change in temperature is minimized. The magnetic encoder comprises a magnetic scale having thereon a magnetic pattern which can be detected by a magnetic sensor, a sensor retainer for securely retaining the magnetic sensor with a magnetic gap left between the magnetic scale and the magnetic sensor, and a supporting member to which the sensor retainer is secured.

According to the invention, a jig is affixed to a surface of the sensor retainer, and the jig is moved until the gap between the magnetic scale and the magnetic sensor reaches a predetermined width. The sensor retainer may be secured to a supporting member by first and second securing agents, the second securing agent being the harder and applied closer to the magnetic sensor than the first securing agent.

7 Claims, 8 Drawing Sheets

METHODS FOR ASSEMBLING AND ADJUSTING A MAGNETIC ENCODER DEVICE

CROSS-REFERENCE TO RELATED APPLICATIONS

This is a division of pending application Ser. No. 07/332,640 filed on Mar. 31, 1989, now U.S. Pat. No. 4,959,574.

BACKGROUND OF THE INVENTION

1. Field of the Invention

This invention relates to a magnetic encoder, and more particularly to adjusting relative positions of a magnetic scale carrying a magnetic pattern and a magnetic sensor which senses that pattern when it moves relative to the magnetic scale.

2. Description of the Prior Art

FIG. 10 shows a conventional magnetic encoder which is disclosed in Japanese Utility Model Laid-Open No. 62-3012.

The magnetic drum 1 serving as a magnetic scale is made of a magnetic material and has a magnetization pattern formed on an outer circumferential periphery thereof. The magnetization pattern is formed by a plurality of magnetic pole pairs arranged at equal circumferential intervals such that adjacent successive pairs of magnetic poles have the polarities N (north), S (south), S, N, N, S, S, N, . . . The rotary shaft 3 extends outwardly from the rotating machine 2 and is securely mounted at the center of the magnetic drum 1. A step 2a serving as a datum clamp face is formed on the surface of the rotating machine 2, and the base member 4 is screwed to the step 2a. The base member 4 has a disk-like configuration and has an upper reference face 4a extending perpendicularly to the axis of the rotary shaft 3. The retaining member 5 is screwed to the reference face 4a of the base member 4. The magnetic sensor 6 which may consist of a pair of magneto-resistance effect elements is attached to the retaining member 5 so that it faces and is spaced from the circumferential face of the magnetic drum 1. Components 11 of an electric circuit for processing an electric signal from the magnetic sensor 6 are carried on the printed circuit board 7. The printed circuit board 7 is secured to the base member 4 by means of a plurality of screws 12 extending through the support tubes 9 and is located above the magnetic drum 1. The lead line 8 is connected at an end thereof to the magnetic sensor 6 and at the other end thereof to the printed circuit board 7. The cover 10 is mounted on top of the rotating machine 2 so as to prevent dust from entering the magnetic drum 1, magnetic sensor 6 and so on.

The two magneto-resistance effect elements of the magnetic sensor 6 are arranged in a circumferentially spaced relationship and separated by a distance equal to $np + \frac{1}{4} \cdot p$ where p is a pitch of the magnetic poles of the magnetization pattern on the magnetic drum 1 and n is an integer. These elements also are arranged in an opposing relationship to the magnetization pattern such that magnetic paths thereof may be directed perpendicularly to the rotary shaft 3. When the magnetic drum 1 is rotated in a predetermined direction by the rotating machine 2, the magneto-resistance effect elements of the magnetic sensor 6 develop two continuous signals having a difference in phase equal to 90 degrees. The two signals are conveyed via the lead line 8 to the printed circuit board 7 where they are processed for amplification, detection and matching to produce incremental pulses from which the displacement and the direction of rotation of the magnetic drum are determined.

In a magnetic rotary encoder as described above, the retaining member 5 is screwed to the base member 4 and the gap between the magnetic sensor 6 and the magnetic drum 1 must be adjusted properly in order that the magnetic sensor 6 may reproduce the magnetization pattern of the magnetic drum 1 with high sensitivity. Unfortunately, the setting of the gap may be upset as the screw is tightened or when the screw is loosened by vibrations from the outside during use. Therefore, a bonding agent is sometimes used to secure the retaining member 5 to the base member 4. However, where a bonding agent is used as a securing means for the retaining member 5, the setting of the gap may be upset by expansion or contraction with temperature of the materials used. It is to be noted that the problem is not recognized by Japanese Utility Model Laid-Open No. 62-3012 mentioned hereinabove.

Further, in the conventional magnetic rotary encoder described hereinabove, to mount the printed circuit board 7 above the magnetic drum 1, the plurality of support tubes 9 are interposed between the printed circuit board 7 and the base member 4 and the comparatively long screws 12 are screwed into the base member 4 from above the printed circuit board 7 through the individual support tubes 9. This makes mounting of the printed circuit board 7 complicated and increases the number of parts, resulting in high production cost of the magnetic rotary encoder.

In the magnetic encoder described above, a suitable gap (a magnetic gap) must be kept between the magnetic sensor 6 and the magnetic pattern of the magnetic drum 1 in order to enable the magnetic sensor 6 to reproduce the pattern sensitively when the magnetic drum 1 acts as a moving magnetic scale. As is well known in the art, the magnetic gap can be adjusted using the following method. A spacer having the width of the required magnetic gap is inserted between the magnetic drum 1 and the magnetic sensor 6, the retaining member 5 is pressed toward the magnetic drum 1, then the retaining member 5 is threadably fixed to the base member 4, and then the spacer is removed. However, the width of the spacer is varied by the pressure on the retaining member 5 toward the magnetic drum 1. And if a spacer is used whose width does not vary under the pressure, the spacer scars the thin sensing film on the magnetic sensor 6 so that the desired sensing characteristics may not be attained. In addition, this adjusting operation requires time and skill which makes it difficult to achieve the most suitable magnetic gap. In the above-mentioned Jap.U.M. Laid-Open No. Sho 62-3,012, this problem is not acknowledged.

SUMMARY OF THE INVENTION

It is an object of the present invention to provide a method for assembling a magnetic encoder wherein a magnetic gap between the magnetic sensor and the magnetic scale can be easily, accurately and reliably adjusted and maintained after adjustment.

This object is achieved by fixing the magnetic sensor to a sensor retainer, affixing an attracting jig to a surface of the sensor retainer, moving the jig to vary the width of the gap until the width reaches an optimal value, and then affixing the sensor retainer to a supporting member.

According to another aspect of the present invention, the present invention comprises further moving the magnetic scale and the magnetic sensor relative to each other in a direction movement in which causes the magnetic sensor to generate an output signal, and measuring the output signal to determine if the gap width is at the optimal value.

According to another aspect of the present invention, the present invention comprises further the step of computing the gap width from an amount of light passing through the gap.

According to another aspect of the present invention, the present invention comprises further the step of temporarily partially securing the sensor retainer to the supporting member before the jig moving step so as to limit movement of the sensor retainer relative to the supporting member.

According to another aspect, the surface of the sensor retainer to which the attracting jig is affixed is a flat surface opposite to the surface to which the magnetic sensor is affixed.

According to another aspect, the attracting jig moves in the direction perpendicular to the direction of movement of the magnetic pattern. According to another aspect, the magnetic pattern is formed on a surface of the magnetic scale, and the jig moving step comprises moving the jig perpendicularly to the surface on which the magnetic pattern is formed.

According to one embodiment of the present invention, the attracting jig positions the sensor retainer so that the magnetic sensor is in contact with the surface of the magnetic scale. Then the sensor retainer with the sensor is moved by the jig away perpendicularly to the surface of the magnetic scale on which surface the magnetic pattern is formed. Meanwhile, the gap is being measured with reference to the original position of the magnetic sensor, that is the position in which the sensor is in contact with the surface of the scale. Alternatively the gap may be measured by the signal generated by the magnetic sensor. The jig is moved until the gap reaches the required width.

According to another aspect of the present invention, a method is provided of setting a predetermined gap between a magnetic rotary member and a magnetic sensor mounted on a sensor retainer integral with a housing, comprising the steps of positioning the magnetic sensor at a predetermined distance from the magnetic rotary member, rotating the rotary member, measuring an output signal produced by the sensor, moving the sensor retainer relative to the rotary member until the output signal is substantially equivalent to a standard signal, and securing the housing to a supporting member, the supporting member being in a fixed position relative to an axis of rotation of said rotary member. According to another aspect, that method comprises attaching a flat face of the sensor retainer facing away from the magnetic rotary member and the magnetic sensor to an attracting jig by vacuum, loosely attaching the housing to the supporting member by screws through holes in the housing, the holes being large enough to allow movement of the housing substantially perpendicularly to shanks of the screws, moving the sensor retainer by the attracting jig substantially perpendicularly to the shanks, and tightening the screws, the heads thereof being large enough not to fit through the holes during the tightening.

According to another aspect, the present invention provides a method of assembling a magnetic encoder, comprising the steps of positioning a magnetic sensor at a predetermined distance from a magnetic rotary member, securing a portion of a sensor retainer on which the magnetic sensor is mounted to a housing by a first securing agent, and securing another portion of the sensor retainer proximate to the magnetic sensor to the housing by a second securing agent, the second securing agent being more resistive to relative lateral motion of the sensor retainer and the housing than the first securing agent.

BRIEF DESCRIPTION OF THE DRAWINGS

FIG. 1 is a sectional view of a magnetic encoder assembled with a motor.

FIG. 2 is an exploded perspective view showing several elements of the magnetic encoder of FIG. 1.

FIGS. 3 and 4 are a top plan view and a side elevational view, respectively, illustrating a step of adjusting a magnetic gap.

FIG. 5 is a sectional view of a magnetic encoder assembled with a motor.

FIG. 6 is an exploded perspective view showing several components of the magnetic encoder of FIG. 5.

FIG. 7 is a side elevational view of a magnetic gap adjusting device.

FIG. 8 is a top plan view of the magnetic gap adjusting device of FIG. 7.

DETAILED DESCRIPTION OF THE PREFERRED EMBODIMENTS

Figure 1:
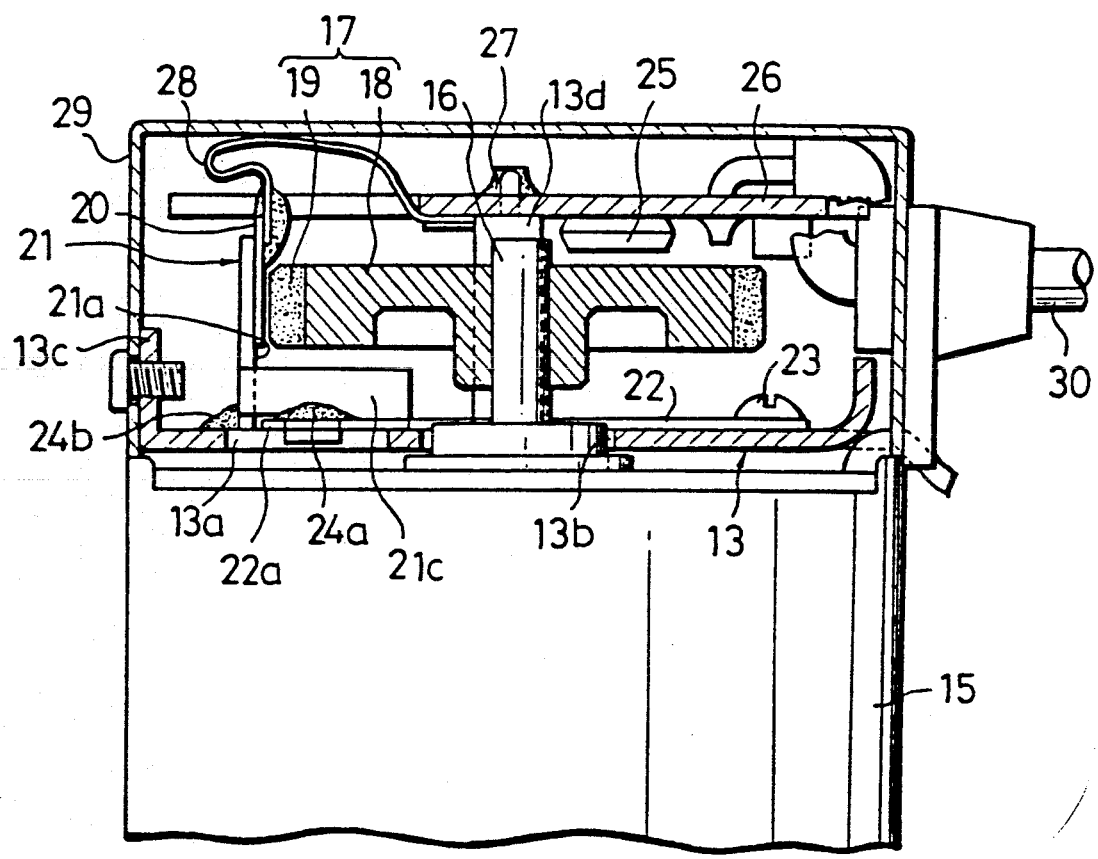
FIGS. 1 to 4 illustrate a magnetic encoder constructed according to the present invention.
Figure 2:
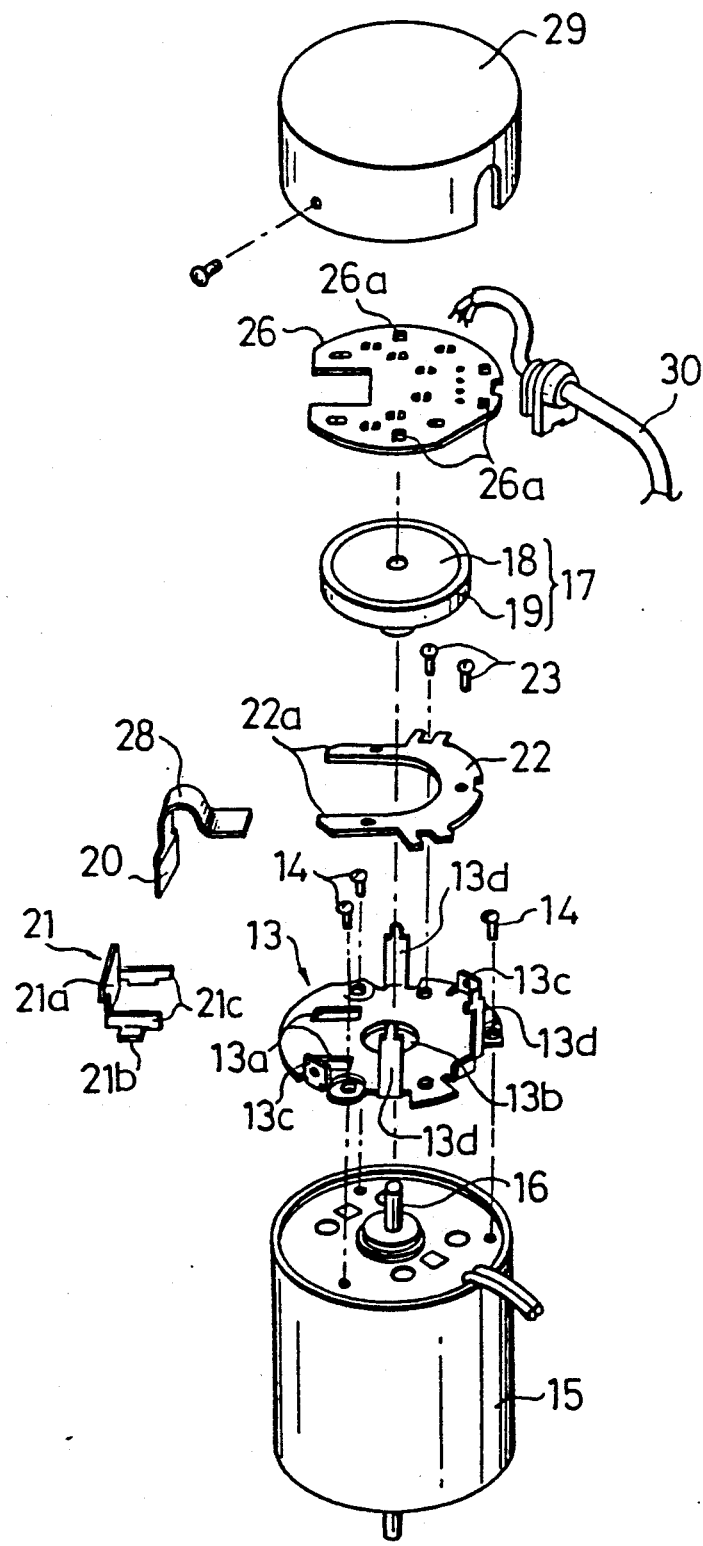
Figure 3:
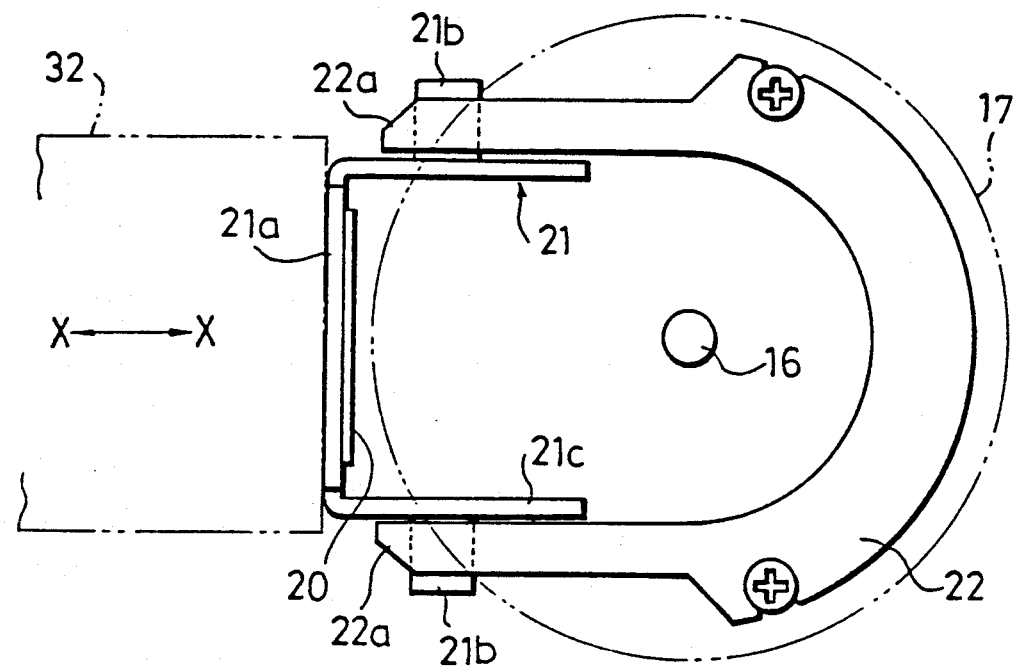
Figure 4:
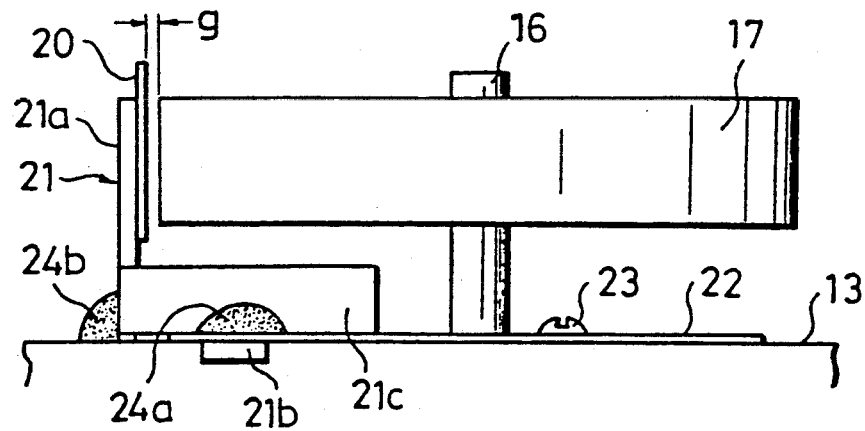

Referring first to FIGS. 1 to 4, embodiments of a magnetic encoder according to the present invention will now be described in detail. First, the embodiments will be described with reference to FIGS. 1 and 2. The magnetic rotary encoder shown includes a housing 13 formed from a metal plate of aluminum or the like by pressing. The housing 13 has an upper face which as a datum clamp face for a sensor retainer which will be hereinafter described. The housing 13 has a pair of openings 13a and a center hole 13b formed in the datum clamp face thereof, and has three short mounting tabs 13c and three bent leg pieces 13d formed on an outer peripheral edge thereof by bending. The housing 13 is securely mounted on the top surface of a rotating machine 15 by means of a plurality of screws 14. The rotating machine 15 has a rotary shaft 16 which extends upwardly through the center hole 13b of the housing 13, and a magnetic drum 17 is securely mounted on the rotary shaft 16. The magnetic drum 17 includes a rotary member 18 made of aluminum or some other suitable metal, and a magnetic member 19 made of plastic magnet or the like and securely mounted on the outer circumferential face of the rotary member 18. The magnetic member 19 has a magnetization pattern (not shown) formed continuously on the outer circumferential periphery thereof by a magnetic recording technique such that a plurality of magnetic pole pairs are arranged at equal circumferential intervals so that adjacent successive pairs of magnetic poles have the polarities N, S, S, N, N, S, S, N, . . .

The magnetic rotary encoder further includes a magnetic sensor 20 secured by an adhesive to a sensor retainer 21. The magnetic sensor 20 may include, for example, a pair of magneto-resistance effect elements which are arranged in a circumferentially spaced relationship and separated by a distance equal to np $+\frac{1}{4}\cdot p$ where p is a pitch of the magnetic poles of the magnetization pattern on the magnetic drum 17 and n is an integer. Magnetic sensor 20 faces and is spaced from the circumferential face of the magnetic drum 17 with a predetermined gap left therebetween. The sensor retainer 21 is formed from a flat metal plate of brass or the like by pressing and has a mounting face 21a on which the magnetic sensor 20 is mounted and a pair of leg pieces 21c each having a lug 21b at the lower end thereof. A sectional face defined by lower faces of the mounting face 21a and the leg pieces 21c of the sensor retainer 21 and having a channel-shape in plan thus serves as a datum clamp face. The lugs 21b of the sensor retainer 21 extend downwardly from the leg pieces 21c and are then bent outwardly at an angle of about 90 degrees and located in the openings 13a of the housing 13.

The magnetic rotary encoder further includes a holding plate 22 formed from an iron plate or the like and securely mounted on the upper surface of the housing 13 by means of a plurality of screws 23. The holding plate 22 is secured at the opposite free ends 22a thereof to the lugs 21b of the sensor retainer 21 by means of a second bonding agent 24a. Meanwhile, the sensor retainer 21 is secured at a lower portion of the mounting face 21a thereof to the housing 13 by means of a first bonding agent 24b. While the first bonding agent 24b and the second bonding agent 24a are made of different materials having different Young's moduli, it is necessary that, within a temperature range in normal use, the second bonding agent 24a be always softer and more flexible than the first bonding agent 24b. In the case of the present embodiment, THREE BOND EP-121, an ultraviolet ray curable epoxy resin by Kabushiki Kaisha Three Bond, is employed as the first bonding agent 24b while WORLD LOCK 836B, an ultraviolet ray, two-liquid mixture curable modified acrylic resin by Kyoritsu Kagaku Sangyo Kabushiki Kaisha, is employed as the second bonding agent 24a.

By securing the datum clamp face of the lower face of the sensor retainer 21 to the housing 13 and the holding plate 22 by adhesion in this manner, the sensor retainer 21 is mounted on the upper face of the housing 13 at the right angle with a high degree of accuracy. Consequently, the magnetic sensor 20 attached to the sensor retainer 21 is retained in a predetermined position with respect to the circumferential face of the magnetic drum 17 as described hereinabove.

A printed circuit board 26 on which circuit components 25 of a signal processing circuit are carried is mounted above the magnetic drum 17. The printed circuit board 26 is secured to the housing 13 so that the ends of the bent leg pieces 13d of the housing 13 fit into mounting holes 26a formed in the printed circuit board 26 and are soldered by solder 27 to solder lands (not shown) formed on the printed circuit board 26. The printed circuit board 26 and the magnetic sensor 20 are electrically connected to each other by a lead line 28 which may be a flexible flat cable. A cover 29 in the form of a cap is screwed to the mounting tabs 13c of the housing 13. The housing 13, magnetic drum 17, magnetic sensor 20, printed circuit board 26 and so on described above are thus protected from external dust and so on by the cover 29. The signal processing circuit on the printed circuit board 26 is connected to an external controlling circuit (not shown) by way of a harness 30 which extends outwardly from the cover 29.

The magnetic rotary encoder having such a construction as described above is assembled with the rotary shaft 16 of the motor 15 in the following manner.

First, the housing 13 is securely mounted onto the top surface of the motor 15 by means of the screws 14, and the holding plate 22 is securely mounted onto the housing 13 by the screw 23. Meanwhile, the magnetic sensor 20 to which the lead line 28 is connected is attached to the mounting face 21a of the sensor retainer 21, and the lugs 21b of the sensor retainer 21 are inserted into the openings 13a of the housing 13 whereafter upper faces of the lugs 21b of the sensor retainer 21 are pressed and held down by the free ends 22a of the holding plate 22. Then the magnetic drum 17 is fitted onto the rotary shaft 16, and the end portions of the bent leg pieces 13d of the housing 13 are inserted into the mounting holes 26a of the printed circuit board 26, and then the solder lands (not shown) of the printed circuit board 26 and the bent leg pieces 13d of the housing 13 are secured to each other by the solder 27. Then, the other end of the lead line 28 is connected to the printed circuit board 26, and then the gap g between the magnetic sensor 20 and the circumferential face of the magnetic drum 17 on which the magnetization pattern is formed is adjusted to an optimum distance using a detecting means such as a microscope or an output meter. In this instance, if an attracting jig 32 is used and fed in the direction indicated by a double-sided arrow mark X—X in FIG. 3 perpendicular to the direction of the axis of the rotary shaft 16 while the mounting face 21a of the sensor retainer 21 is attracted and held by the attracting jig 32, then the appropriate gap g can be set readily.

After adjustment of the magnetic sensor 20 in this manner, the condition is maintained while the second bonding agent 24a is applied between the holding plate 22 and the sensor retainer 21, that is, between the free ends 22a of the holding plate 22 and the lugs 21b of the sensor retainer 21 and is left until it cures. After that, the attracting jig 32 is retracted from the sensor retainer 21, and then the first bonding agent 24b is applied between the lower end of the mounting face 21a of the sensor retainer 21 and the housing 13 and is left until it cures, thereby completing fixation of the sensor retainer 21 (refer to FIG. 4).

Finally, the cover 29 is placed on the housing 13 over all the parts except the harness 30 and screwed to the mounting tabs 13c of the housing 13, thereby completing the assembly of the magnetic rotary encoder shown in FIG. 1.

In the magnetic rotary encoder assembled in this manner, if the ambient temperature varies, the components of the magnetic rotary encoder will expand or contract in accordance with their coefficients of expansion so that the housing 13, the holding plate 22 and the sensor retainer 21 which is secured by an adhesive to the housing 13 and holding plate 22 will move relative to each other. Since the housing 13 is made of an aluminum material in the present embodiment and has a higher coefficient of linear expansion than the other two members, the amount of expansion of the housing 13 when the temperature rises is greater than the amounts of expansion of the sensor retainer 21 and the holding plate 22. However, the difference in amount of expansion is almost entirely absorbed at the locations between the lugs 21b of the sensor retainer 21 and the free ends 22a of the holding plate 22, and accordingly, near the first bonding agent 24b which is harder than the second bonding agent 24a, the mounting face 21a of the sensor retainer 21 moves but little relative to the housing 13. Since the amount of movement of the sensor retainer 21 relative to the housing 13 when the temperature varies is smaller at a location near the mounting face 21a of the sensor retainer 21 at which the magnetic sensor 20 is attached and greater at a location remote from the mounting face 21a, the sensor retainer 21 is held positioned for a long period of time relative to the housing 13 near the mounting face 21a which determines the accuracy of the gap.

It is to be noted that holding plate 22, which is used to keep sensor retainer 21 in position before sensor retainer 21 is attached to housing 13 by adhesive 24b, can be omitted if the sensor retainer 21 is held on the housing 13, for example, by means of a holding jig or the like. Also in this instance, a portion of the sensor retainer 21 remote from the mounting face 21a will be adhered to the housing 13 by the second bonding agent 24a while another portion of the sensor retainer 21 near the mounting face 21a will be adhered to the housing 13 by means of the first bonding agent 24b.

Another embodiment of the present invention will be described in detail in reference to FIGS. 5 to 8. First, the magnetic encoder of the present invention will be described in reference to FIGS. 5 and 6. The magnetic rotary encoder shown includes a housing 13 formed from a metal plate by pressing. The housing 13 has a center hole 13b perforated at the center thereof and a plurality of perforations 13g around the center hole 13b thereof. The housing 13 further has a sensor retainer 13e and a pair of supporting leg portions 13d formed by bending at the right angles. The housing 13 formed by pressing in this manner is placed on and secured to the top surface of a rotating machine 15 (used as supporting means for supporting housing 13) by means of screws 23 which extend through the perforations 13g of the housing 13 and are screwed into threaded holes 15a formed in the top surface of the rotating machine 15. It is to be noted that a bonding agent (not shown) is applied to arbitrary locations of contacting portions between the housing 13 and the rotating machine 15 to secure them to each other surer.

The rotating machine 15 has a rotary shaft 16 which extends upwardly through the center hole 13b of the housing 13, and a magnetic drum 17 is securely mounted on the rotary shaft 16. The magnetic drum 17 is composed of a rotary member 18 made of aluminum or some other suitable metal, and a magnetic member 19 made of plastic magnet or the like and securely mounted on an outer circumferential face of the rotary member 18. The magnetic member 19 has a magnetization pattern (not shown) formed continuously on an outer circumferential periphery thereof by a magnetic recording technique such that a plurality of magnetic pole pairs are arranged at equal circumferential intervals so that adjacent successive pairs of magnetic poles have the polarities N, S, S, N, N, S, S, N, . . .

The sensor mounting portion 13e of the housing 13 has an outer wall which serves as a flat attracting face 13f while a magnetic sensor 20 is secured by an adhesive to an inner wall of the sensor mounting portion 13e, and a gap g is formed between the magnetic sensor 20 and an outer circumferential face of the magnetic drum 17. The magnetic sensor 20 is composed of a pair of magneto-resistance effect elements which are arranged in a circumferentially spaced relationship and separated by a distance equal to $np + \frac{1}{2} \cdot p$ where p is a pitch of the magnetic poles of the magnetization pattern on the magnetic drum 17 and n is an integer.

A printed circuit board 26 on which circuit components of a signal processing circuit are carried is placed above the magnetic drum 17. The printed circuit board 26 is secured to the housing 13 by means of fitting the ends of the supporting leg portions 13d of the housing 13 into a pair of mounting holes 27 formed in the printed circuit board 26 and soldering them. The printed circuit board 26 and the magnetic sensor 20 are electrically connected to each other by a lead line 28 which may be a flexible flat cable. The printed circuit board 26 is further connected to an external controlling circuit by means of a harness 30. A cover 29 is provided for protecting the housing 13, magnetic drum 17, magnetic sensor 20, printed circuit board 26 and so on described above from external dust and so on.

Subsequently, a process of adjusting the gap g between the magnetic drum 17 and the magnetic sensor 20 will be described with reference to FIGS. 7 and 8 in which a gap adjusting device 31 is shown.

Figure 7:
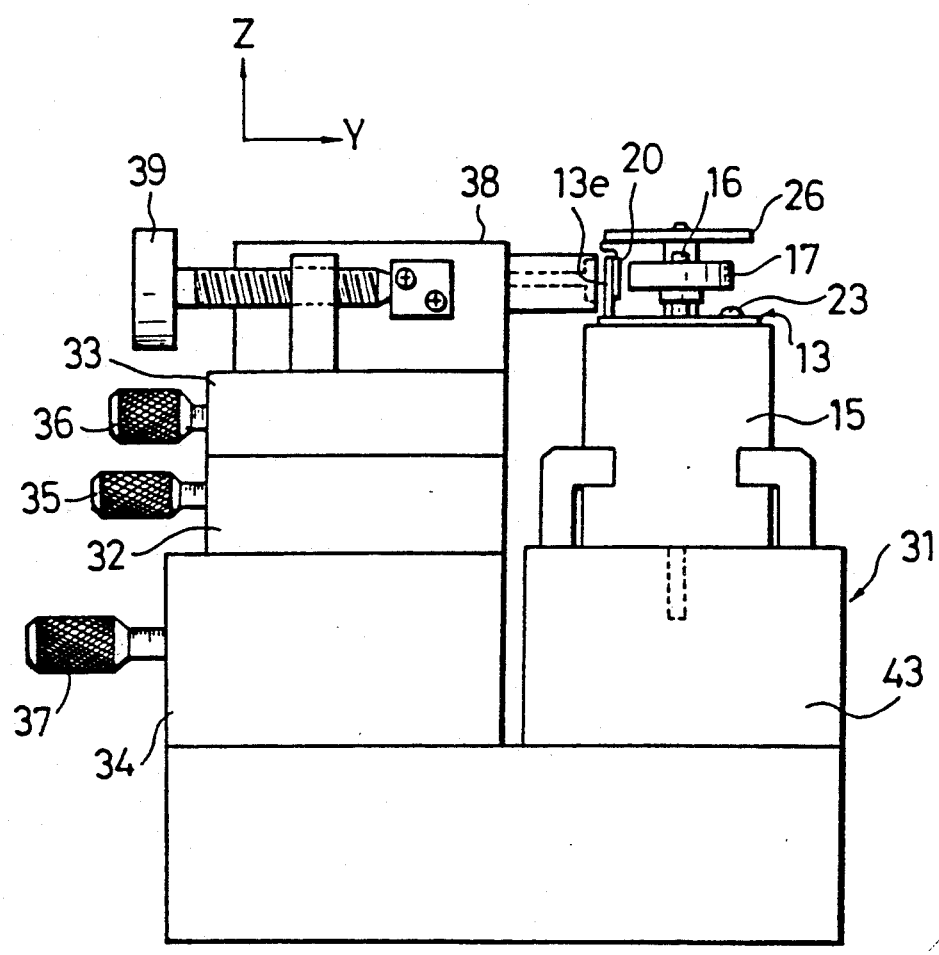
Figure 8:
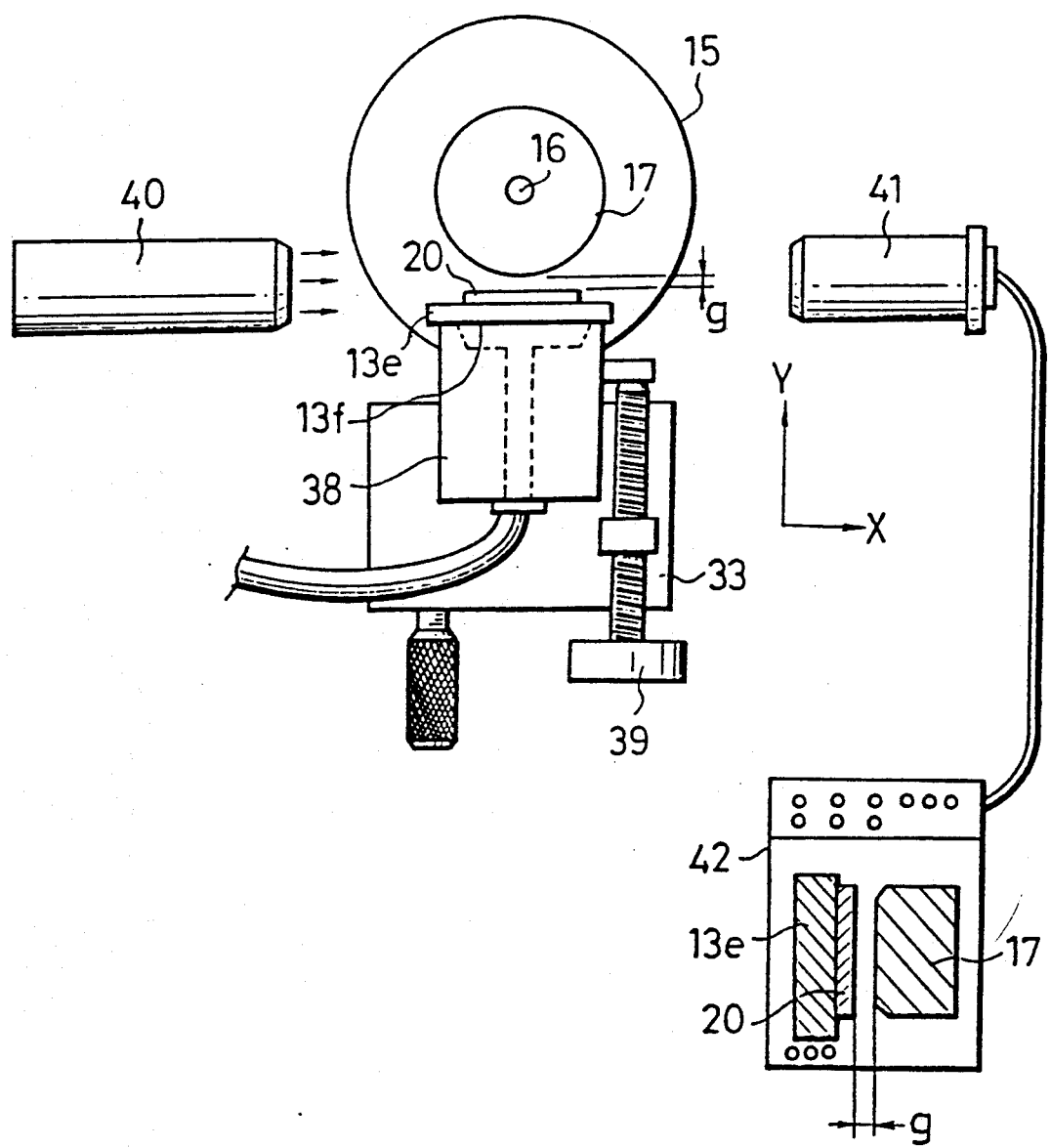

The gap adjusting device 31 includes an X-axis stage 32, a Y-axis stage 33 and a Z-axis stage 34 which are moved back and forth in the directions indicated by arrow marks X, Y and Z in FIGS. 7 and 8 by turning knobs 35, 36 and 37, respectively. An attracting jig 38 can be moved back and forth in the Y direction by turning a feed dial 39. The attracting jig 38 terminates in a flat face parallel to the X-Z plane, and an attracting pump (not shown) is connected to a rear end of the attracting jig 38. As apparently seen from FIG. 8, a light emitting member 40 and a camera 41 are placed at the opposite sides of the attracting jig 38 interposed therebetween, and a monitor display 42 is connected to the camera 41. A motor retaining table 43 is placed side by side with the Z-axis stage 34.

In adjusting the gap g, at first the rotating machine 15 on which the whole magnetic rotary encoder including the housing 13, magnetic drum 17 and so on except the cover 29 is assembled is secured to the motor retaining table 43 of the gap adjusting device 31 with the axial line of the rotary shaft 16 along the Z-axis. In this instance, the individual screws 23 are held in a loosened condition so that the housing may move by the amount of clearance between the screws 23 and the perforations 13g of the housing 13.

Subsequently, the attracting pump (not shown) is rendered operative to cause the attracting jig 38 to attract the attracting face 13f of the sensor mounting portion 13e of the housing 13 thereto by vacuum. After the housing 13 is attracted and held by the attracting jig 38 in this manner, the knobs 35, 36 and 37 are individually turned to move the X-axis stage 32, Y-axis stage 33 and Z-axis stage 34 in the directions indicated by the arrow marks X, Y and Z, respectively, until the center of the magnetic sensor 20 coincides with the center of the magnetic drum 17. Such positioning needs not be performed for individual magnetic rotary encoder devices of the same model wherein the relative dimensions of the rotating machine 15, housing 13 and so on do not vary.

After that, the feed dial 39 is turned to advance the attracting jig 38 in the direction of the arrow mark Y to move the magnetic sensor 20 to the circumferential face of the magnetic drum 17. This motion is displayed on the monitor display 42 by way of the camera 41, and the feeding movement of the attracting jig 38 is stopped at a point of time when the magnetic sensor 20 comes in contact with the circumferential face of that magnetic drum 17. Here, the gap g is as] zero, and a gauge (not shown) is set to zero.

After the gap g is set to the zero position, the attracting jig 38 and the housing 13 are retracted in the direction indicated by the arrow mark Y by means of the feed dial 39 to gradually move the magnetic sensor 20 away from the circumferential face of the magnetic drum 17. Here, if the motor of the rotating machine 15 is driven to rotate, then an output signal is delivered from the magnetic sensor 20. Thus, at a point of time when the output signal of the magnetic sensor 20 comes to exhibit an optimum waveform, the feeding movement of the attracting jig 38 is stopped. Here, the position of the gap is determined to be appropriate, and a value indicated by the gauge then is read out in order to determine if the magnetic sensor 20 is indeed positioned at the appropriate position.

After the gap g is adjusted in this manner, the individual screws 23 are tightened to secure the housing 13 to the top surface of the rotating machine 15 while the the housing 13 is kept attached by vacuum to the attracting jig 38. At this time, if a bonding agent is applied to base portions of the supporting leg portions 13d of the housing 13, then the housing 13 will be secured more surely.

Figure 5:
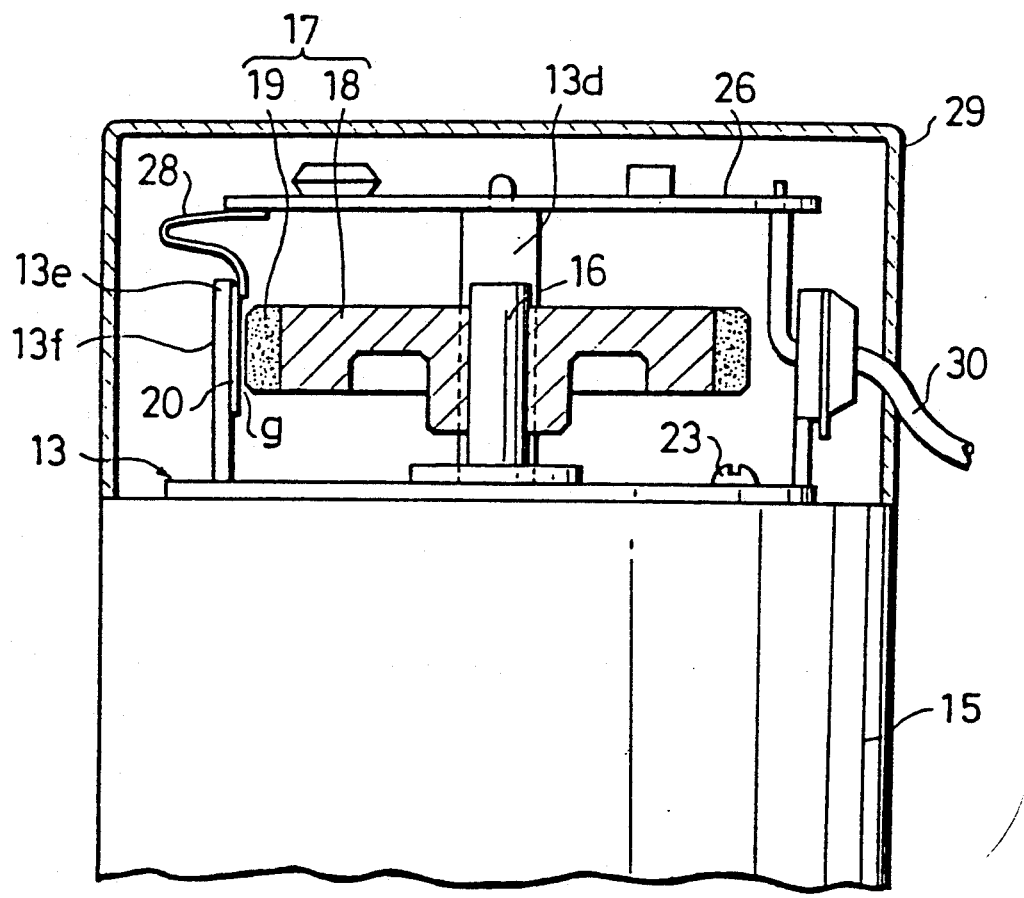
FIGS. 5 to 8 illustrate an embodiment of the present invention.
Figure 6:
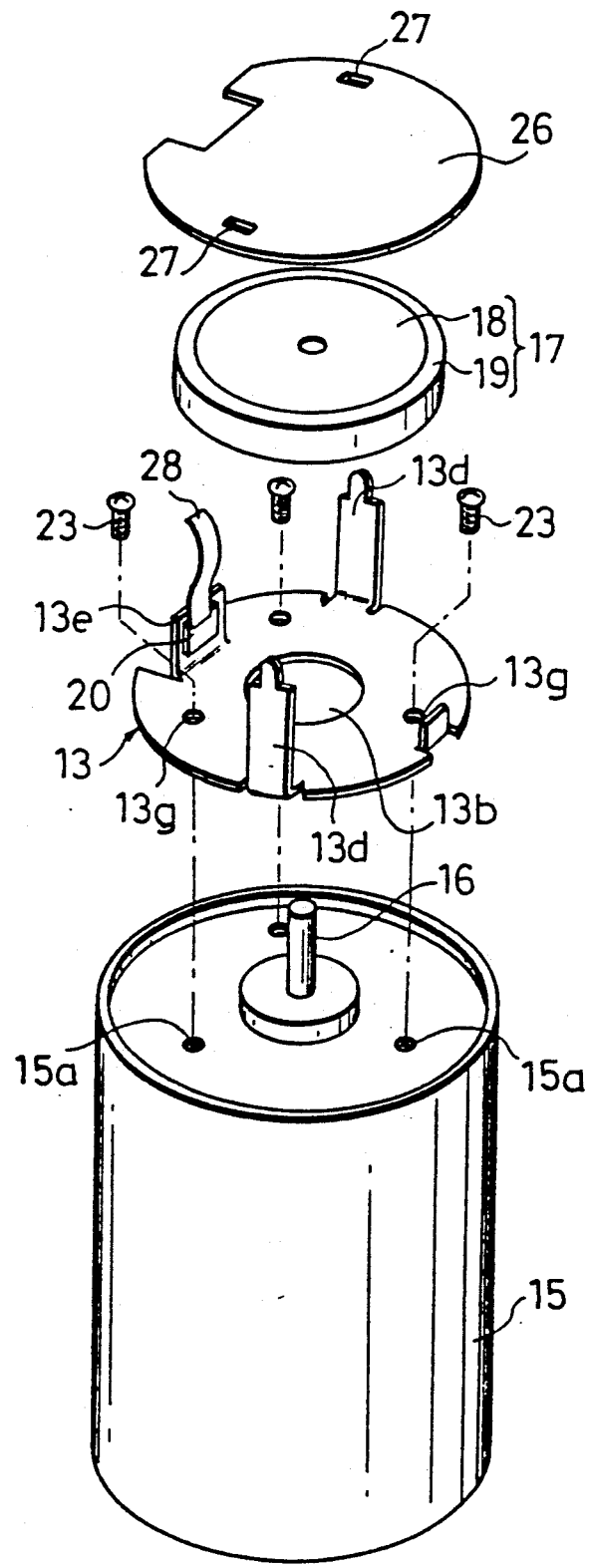

Finally, the attracting pump is stopped and the rotating machine 15 is removed from the gap adjusting device 31, and then, if necessary, a bonding agent is applied to base portions of the bent portions of the sensor retainer 13e. After that, the cover 29 is mounted on the rotating machine 15, thereby obtaining such a magnetic rotary encoder as shown in FIG. 5.

Figure 9:
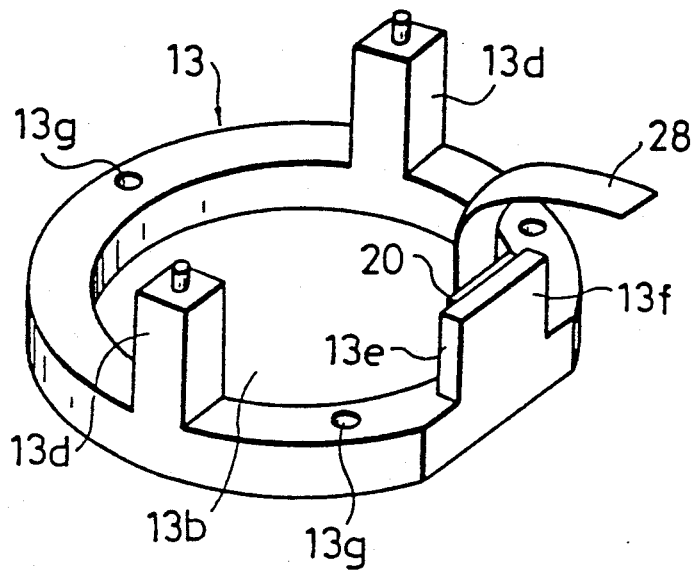
FIG. 9 is a perspective view showing a modified form of housing of the encoder shown in FIGS. 1 and 2.
Figure 10:
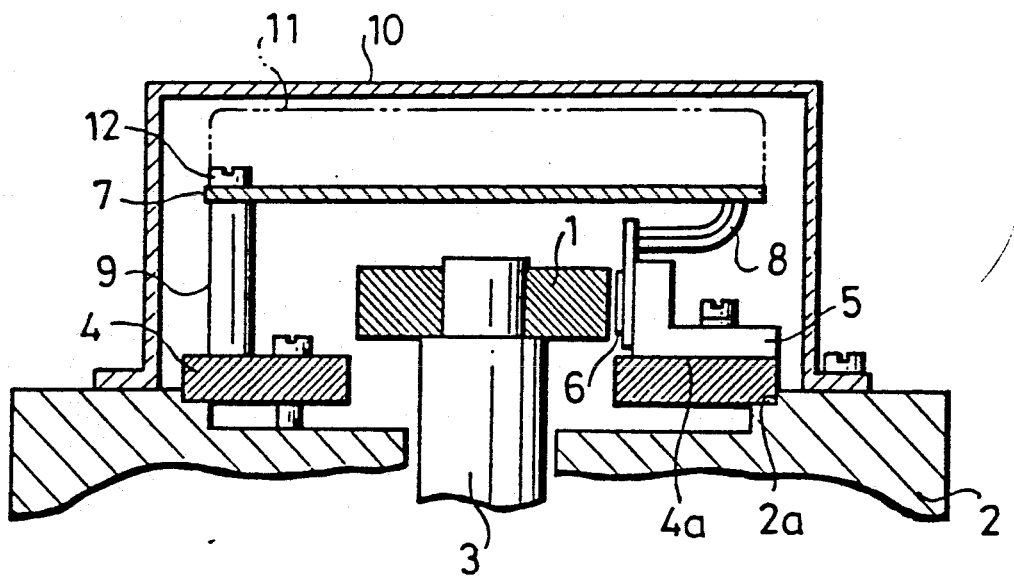
FIG. 10 is a sectional view showing a prior art magnetic encoder.

While in the embodiment described above the housing 13 is formed from a metal plate, it may otherwise be formed by molding from a synthetic resin material as shown in FIG. 9. In this case, the printed circuit board 26 may be placed on and secured to upper ends of the supporting leg portions 13d of the housing 13 by heat caulking or the like.

Further, the sensor retainer 13e and the housing 13 do not have to be in an integral relationship, and at any rate, it is only necessary that, after the appropriate gap has been set with the sensor retainer held attracted to the attracting jig, the sensor retainer be secured to the datum clamp face directly or by way of some other member.

Further, while in the embodiment described above an output signal of the magnetic sensor 20 and actual measurement by the camera 41 are both used as the means for setting the gap g, this invention is not limited to this way of gap setting, and it is possible, for example, to adjust the gap g using only the output signal without measuring the gap by a gauge or only measuring the gap by a gauge without using the output signal.

In addition, while in the embodiment described above the magnetic scale 17 is a magnetic drum, it is a matter of course that the present invention can be applied also to a magnetic disk.

Having now fully described the invention, it will be apparent to one of ordinary skill in the art that many changes and modifications can be made thereto without departing from the spirit and scope of the invention as set forth herein.

What is claimed is:

1. A method for assembling and adjusting a magnetic encoder, comprising the steps of:
    fixing a magnetic sensor capable of sensing a magnetic pattern carried by a magnetic scale to a first surface of a sensor retainer;
    affixing an attracting jig to a second surface of said sensor retainer;
    moving said jig to vary a width of a gap between said magnetic scale and said magnetic sensor until said width reaches a predetermined optimal value at a mounting reference position;
    affixing said sensor retainer to a supporting member when said width reaches said mounting reference position; and
    releasing said sensor retainer at said mounting reference position from said attracting jig.

2. A method of claim 1, further comprising the steps of:
    moving said magnetic scale and said magnetic sensor relative to each other in a direction of movement such that said magnetic sensor generates an output signal; and
    measuring said output signal to determine if said gap width is at said predetermined optimal value.

3. A method of claim 2, wherein:
    said step of moving said magnetic scale and said magnetic sensor comprises moving said magnetic pattern; and
    said jig moving step comprises moving said jig in a direction perpendicular to a direction of movement of said magnetic pattern.

4. A method of claim 2, wherein:
    said magnetic pattern is formed on a surface of said magnetic scale; and
    said jig moving step comprises moving said jig perpendicularly to said surface on which said magnetic pattern is formed.

5. A method of claim 1, further comprising the step of computing said gap width from an amount of light passing through said gap.

6. A method of claim 1, comprising further the step of temporarily partially securing said sensor retainer to said supporting member before said jig moving step so as to limit movement of said sensor retainer relative to said supporting member.

7. A method of claim 1, wherein said first surface is a flat surface opposite to said second surface.

* * * * *